US012687465B2

(12) United States Patent
Granjon

(10) Patent No.: US 12,687,465 B2
(45) Date of Patent: Jul. 21, 2026

(54) METHOD AND DEVICE FOR ANALYSING A DEVICE FOR SPRAYING A PHARMACEUTICAL FLUID PRODUCT

(71) Applicant: APTAR FRANCE SAS, Le Neubourg (FR)

(72) Inventor: Guillaume Granjon, La Vacherie (FR)

(73) Assignee: APTAR FRANCE SAS, Le Neubourg (FR)

( * ) Notice: Subject to any disclaimer, the term of this patent is extended or adjusted under 35 U.S.C. 154(b) by 204 days.

(21) Appl. No.: 18/725,971

(22) PCT Filed: Dec. 20, 2022

(86) PCT No.: PCT/FR2022/052435
§ 371 (c)(1),
(2) Date: Jul. 1, 2024

(87) PCT Pub. No.: WO2023/126598
PCT Pub. Date: Jul. 6, 2023

(65) Prior Publication Data
US 2025/0076158 A1      Mar. 6, 2025

(30) Foreign Application Priority Data
Dec. 30, 2021    (FR) .................................. FR2114693

(51) Int. Cl.
*G01M 99/00*          (2011.01)
*G01N 21/88*          (2006.01)
(52) U.S. Cl.
CPC ...... *G01M 99/008* (2013.01); *G01N 21/8851* (2013.01)
(58) Field of Classification Search
CPC .............. A61M 11/02; A61M 2205/70; A61M 2205/3306; B05B 12/004
See application file for complete search history.

(56) References Cited

U.S. PATENT DOCUMENTS

| | | | |
|---|---|---|---|
| 2007/0242871 A1* | 10/2007 | Prociw | ...................... G06T 7/62 |
| | | | 382/141 |
| 2016/0216108 A1 | 7/2016 | Bettinelli | |
| 2019/0376106 A1 | 12/2019 | Boisvilliers | |

FOREIGN PATENT DOCUMENTS

| | | |
|---|---|---|
| EP | 3 047 912 A1 | 7/2016 |
| JP | 54-127347 A | 10/1979 |

(Continued)

OTHER PUBLICATIONS

International Preliminary Report on Patentability dated Jun. 20, 2024 with a Translation of the Written Opinion of the International Searching Authority in Application No. PCT/FR2022/052435.

(Continued)

*Primary Examiner* — Thanh Luu
(74) *Attorney, Agent, or Firm* — Sughrue Mion, PLLC

(57) ABSTRACT

Method for analysing a device for spraying a pharmaceutical fluid, including the steps of providing a spray head having a spray opening; providing a receiving surface having a perforated plate having a plurality of holes, each hole being associated with a ball that is guided through a guide channel until reaching a transparent pane behind which a camera is arranged; charging the perforated plate with an electrostatic charge to attract the balls to the holes; passing a gas stream through the spray head and sending it onto the receiving surface, the balls that are hit by the gas stream being moved to the pane; visualising the impact zone for the compressed gas stream on the receiving surface that is formed by the balls that have been moved to the pane; and analysing the visualisation of the impact zone to determine whether or not the impact zone complies with predetermined specifications.

10 Claims, 1 Drawing Sheet

(56)     References Cited

FOREIGN PATENT DOCUMENTS

| | | |
|---|---|---|
| JP | 5-99802  A | 4/1993 |
| WO | 2018/130791  A1 | 7/2018 |

OTHER PUBLICATIONS

International Search Report for PCT/FR2022/052435 dated Apr. 5, 2023.
Written Opinion for PCT/FR2022/052435 dated Apr. 5, 2023.

* cited by examiner

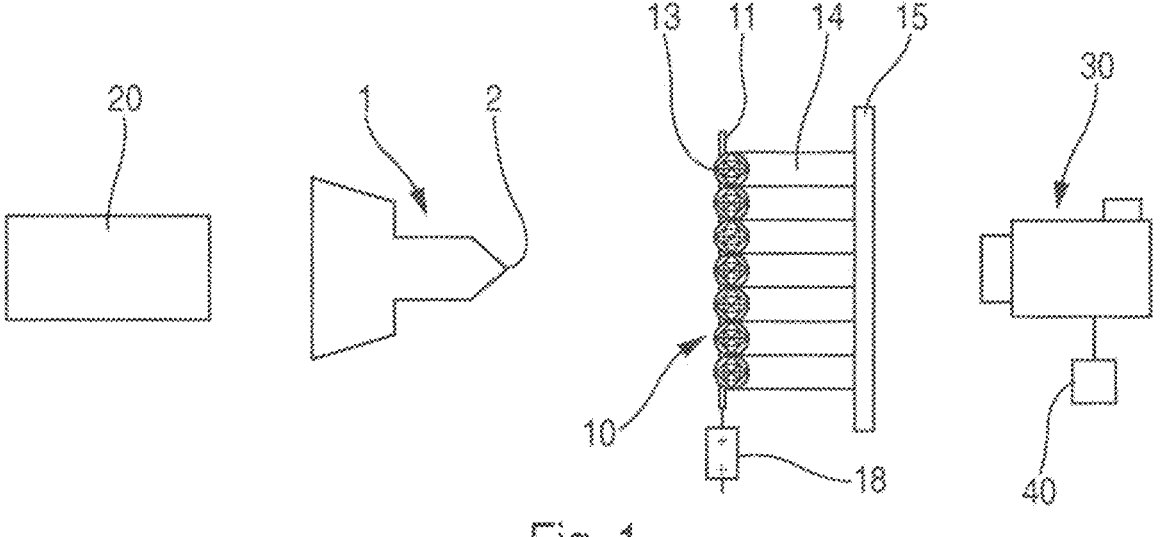
Fig. 1
Fig. 2
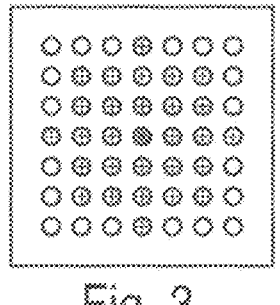
Fig. 3
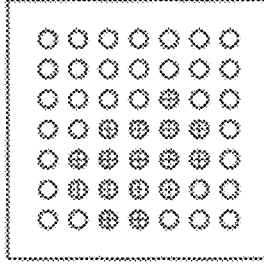
Fig. 4

METHOD AND DEVICE FOR ANALYSING A DEVICE FOR SPRAYING A PHARMACEUTICAL FLUID PRODUCT

CROSS REFERENCE TO RELATED APPLICATIONS

This application is a National Stage of International Application No. PCT/FR2022/052435 filed on Dec. 20, 2022, claiming priority based on French Patent Application No. FR2114693 filed on Dec. 30, 2021.

The present invention relates to a device and to a method for analysing a spray generated by a device for spraying a pharmaceutical fluid product.

Spray devices for spraying pharmaceutical fluid product are well known. They generally comprise a spray head provided with a spray orifice, assembled on a reservoir containing the fluid product to be distributed. Particularly in nasal spray applications, the therapeutic effectiveness of the sprayed fluid product may depend on the properties of the spray generated while the device is being actuated. At the end of the assembly line, i.e. once the spray device has been assembled and just prior to being sent to the pharmaceutical fluid product manufacturer for assembly there onto a corresponding reservoir, it is known for a certain number of samples of assembled devices to be laboratory tested in order to check whether the properties of the spray correspond to pre-defined production specifications.

A disadvantage with that system is that it pertains to assembled devices, and thus destroys those devices which, after having been tested, can no longer be delivered to the customer.

Furthermore, the system requires human verification of the tested devices, and is thus not suitable for being completely automated.

To overcome this disadvantage, the document WO 2018/130791 proposes visualization of a flow of hot or cold compressed air sent through a spray head by strioscopy. That method makes it possible to evaluate the angle of the spray, but not its geometry, nor its symmetry. This also has the disadvantage of having to provide a strioscopic bench, which is relatively complex and expensive, and which is difficult to adapt to an assembly line for a fluid spray device, and therefore involves either random tests carried out on only a portion of the manufactured devices, or slowing down the assembly line, which is generally undesirable.

Documents EP 3 047 912, JPH 0599802 and JPS 5412 7347 describe other prior art devices.

An object of the present invention is to overcome the above-mentioned drawbacks.

In particular, the aim of the present invention is to provide a device and a method for analysing a device for spraying a pharmaceutical fluid product that do not involve the destruction of the tested devices.

The present invention also aims to provide a device and a method for analysing which is substantially automated.

The present invention also aims to provide a device and method for analysing which makes it possible to test 100% of the spraying devices, without slowing down the assembly line to a substantial extent.

Another aim of the present invention is to provide a device and method for analysis which is simple and/or inexpensive to manufacture, assemble and use.

What is therefore presented is a method for analysing a device for spraying a pharmaceutical fluid product, comprising the following steps:

providing a spray head for a device for spraying a pharmaceutical fluid product, said spray head comprising a spray orifice;

providing a receiving surface comprising a perforated plate comprising a plurality of holes, each hole being associated with a ball, in particular made of polystyrene, guided in a guide channel, in particular made of glass, said guide channels extending parallel to one another until reaching a transparent pane behind which a camera is arranged, charging said perforated plate with an electrostatic charge to attract by static electricity said balls to said holes, passing a gas stream through said spray orifice of said spray head, and sending it onto said receiving surface, said balls that are hit by the gas stream being moved to said pane, visualising the impact zone for said compressed gas stream on said receiving surface that is formed by the balls that have been moved to the pane, and analysing said visualisation of said impact zone in order to determine whether or not said impact zone complies with predetermined specifications.

Advantageously, said gas stream is a compressed gas stream.

Advantageously, said compressed gas stream is a compressed air stream.

Advantageously, said step for analysing comprises determining the geometry, in particular the symmetry, of the impact zone for said compressed gas stream on said receiving surface.

Advantageously, said predetermined specifications comprise a predetermined planar extent of the impact zone for said gas stream on said receiving surface, in a manner such that the spray heads for which said planar extent is similar to said predetermined planar extent are classified as compliant, and the spray heads for which said planar extent is different from said predetermined planar extent are classified as non-compliant.

Advantageously, the operating cycle comprises the following steps:

connecting said perforated plate to ground in order to eliminate any electrical charges, charging said perforated plate with an electrostatic charge to attract said balls to said holes, generating said gas stream and sending it through said spray head onto said receiving surface, each ball that is hit by said gas stream detaching from said perforated plate and being guided onto said pane, visualising said impact zone by taking an image of the balls on said pane by means of said camera.

The present invention also concerns a device for analysing a device for spraying a pharmaceutical fluid product, comprising:

a spray head for a device for spraying a pharmaceutical fluid product, said spray head comprising a spray orifice;

a receiving surface comprising a perforated plate comprising a plurality of holes, each hole being associated with a ball, in particular made of polystyrene, guided in a guide channel, in particular made of glass, said guide channels extending parallel to one another until reaching a transparent pane, an electrical device for charging said perforated plate with an electrostatic charge to attract said balls by static electricity to said holes of said perforated plate, means for generating a gas stream in order to pass a gas stream through said spray orifice of said spray head and sending it onto said receiving surface, said balls that are hit by the gas stream being moved to said pane, a camera for visualising the impact zone for said compressed gas stream on said receiving surface by taking an image of the balls that have been moved by said gas stream to the pane, and means for analysing for the analysis of said image of said impact zone in order to determine whether or not said impact zone complies with predetermined specifications.

Advantageously, said compressed gas stream is a compressed air stream.

Advantageously, said holes are equidistant from and close to one another, thus forming a regular and dense array of holes on said receiving surface.

Advantageously, said means for generating a compressed gas stream are adapted to generate pulses of adjustable duration, in particular from 50 to 300 ms.

These features and advantages and others will appear more clearly during the detailed description below, made in reference to the accompanying drawings, given as non-limiting examples, and wherein:

FIG. 1 is a diagrammatic view of a device for analysing a spray device in accordance with an advantageous embodiment, before actuation, FIG. 2 is a view similar to the view in FIG. 1, during actuation, FIG. 3 shows a visualisation of a compliant impact zone, and FIG. 4 shows a visualisation of a non-compliant impact zone.

One aim of the invention is to improve the quality of spray device inspection. To this end, the invention envisages the analysis of 100% of the devices, without substantially slowing down the assembly line. In conventional manner, each spray device comprises a spray head 1 provided with a spray orifice 2. In general, a spray profile (not shown) is provided upstream of said spray orifice 2 in order to generate a conical spray shape at the outlet from the orifice.

The present invention envisages passing a gas stream F1, preferably compressed, through each spray head 1, and directing this compressed gas stream F1 leaving the spray orifice 2 in the form of a conical spray towards a receiving surface 10. Advantageously, the compressed gas stream F1 is a compressed air stream, but it should be understood that, in accordance with the invention, any suitable gas other than air could be used.

FIGS. 1 and 2 shows a test device according to an advantageous embodiment.

In this example, a spray head 1 is disposed opposite a receiving surface 10. Means 20 for generating a compressed gas stream F1 are provided in order to cause a compressed gas stream F1 to pass through the spray head 1.

The receiving surface 10 forms a plane comprising a perforated plate 11 comprising a plurality of holes 12. This perforated plate 11 can be electrically charged with an electrostatic charge. Each hole 12 is associated with a ball 13, preferably made of polystyrene, guided in a guide channel 14, preferably made of glass. The guide channels 14 all extend parallel to one another until reaching a transparent pane 15, advantageously connected to the ground. When the perforated plate 11 is not charged, the balls 13 are arranged on the pane 15. When the perforated plate 11 is charged, the balls 13 are attracted by static electricity to the holes 12 of the perforated plate 11. When a ball 13 is hit by the gas stream F1, it detaches from the perforated plate 11 and is moved to the pane 15. Thus, the pattern of balls on the pane 15 after sending the gas stream F1 onto the receiving surface 10 corresponds perfectly to the impact zone of said gas stream F1 on the receiving surface 10.

A camera 30 is arranged behind the pane 15, in order to visualise this pattern of beads and therefore the impact zone.

It should be noted that the orientation of the test device is not necessarily that shown in FIGS. 1 and 2, an advantageous orientation being vertical, with the gas stream F1 arriving from above onto the perforated plate 11.

Before each analysis, the perforated plate 11 is connected to the ground in order to eliminate any electrical charges from the receiving surface 10. This causes all the balls 13 to fall back onto the pane 15.

Then, the perforated plate 11 is charged by applying an electrostatic charge by means of a suitable electrical device 18, which attracts each ball 13 to its respective hole 12 of the perforated plate 11.

A gas stream F1, in particular of compressed air, is then generated and sent through the spray head 1 towards the receiving surface 10. The force of the gas stream F1 detaches the balls 13 from the perforated plate 11 subjected to an electrostatic charge. In other words, each ball 13 that is hit by said gas stream F1 will detach from the perforated plate 11 and be guided by its respective guide channel 14 to the pane 15.

The camera 30 then takes an image of this pane 15, with the balls 13 having been hit by the gas stream F1 forming the impact zone on said pane 15.

After each actuation, the perforated plate 11 and the pane 15 are grounded again, then an electrostatic charge is again applied to the perforated plate 11 to attract the balls to the holes 12 of the perforated plate 11. The device is thus ready for another actuation. If necessary, it is possible to check the position of the balls 13 with the camera 30, and if all the balls 13 are pressed against the perforated plate 11, it is possible to restart a new test.

Advantageously, the holes 12 are equidistant from and close to one another, thereby forming a regular and dense array of holes 12 on the receiving surface 10. The more holes 12 there are and the smaller these holes 12 are, and therefore the more balls 13 there are and the smaller these balls are, the more accurate will be the definition of the impact zone for the gas stream F1 on the receiving surface 10 and the better will be the rendering of the shape of this impact zone.

In order to carry out the compliance evaluations, a camera 30 is provided to visualize the impact zone and analysis means 40 are provided to analyse the visualizations generated by the camera 30 and thus determine whether the impact zone of the gas stream F1 coming from said spray head 1 onto the receiving surface 10 is compliant or not with predetermined specifications.

The duration of the gas pulse F1 is advantageously adjustable, in particular from 50 to 300 ms.

Advantageously, it is possible to carry out a plurality of successive cycles on the same spray head, for example five cycles. The consistency or repeatability of the results also makes it possible to evaluate the compliance of said spray head.

The predetermined specifications may comprise a predetermined planar extent of said impact zone on said receiving surface 10, in a manner such that the spray heads 1 for which said planar extent is similar to said predetermined planar extent are classified as compliant, and the spray heads 1 for which said planar extent is different from said predetermined planar extent are classified as non-compliant. The geometry, and in particular the symmetry, of the impact zone may also be used in the compliance evaluation. Other parameters may also be envisaged.

The analysis means 40 may comprise means for measuring the geometry of the impact zone of the gas stream F1 on the reception zone 10. As an example, the centre of mass of the impact zone is determined, and the maximum and minimum distances of this centre of mass from the edge of the impact zone are measured. Comparing these distances with predetermined values then makes it possible to evaluate the compliance of the tested device. Thus, the compliance evaluation takes not only the surface of the impact zone into account, but also its geometry, in particular its symmetry. This makes it possible to establish that a spray leaving a compliant spray head will have an acceptable conical shape, both from the point of view of the angle of the spray and as regards its symmetry. Optionally, image processing means may be used to carry out this type of analysis.

FIGS. 3 and 4 each illustrate a diagrammatic representation obtained with the method and the device of the invention, in which it is possible to evaluate the planar extent and the geometry, in particular the symmetry, of the impact zone. FIG. 3 shows a visualisation of the impact zone for a compliant device and FIG. 4 shows such a visualisation for a non-compliant device.

The present invention presents numerous advantages, and in particular:

it enables various types of spray device to be inspected in an automated manner;

it enables said spray devices to be analysed non-destructively;

it makes it possible to analyse 100% of the spray devices assembled on an assembly line, without slowing down the assembly line substantially;

it makes it possible to carry out several successive tests on the same device in order to evaluate the repeatability of the results;

it uses a setup that is compact and that can easily be adapted;

it uses components which are simple and standard, and thus generally inexpensive;

it enables image processing to be robust, and it can be carried out in real time;

it guarantees good repeatability and good discrimination between compliant and non-compliant devices.

The present invention has been described with reference to an advantageous embodiment, but naturally any modification could be applied thereto by the person skilled in the art, without going beyond the scope of the present invention, as defined by the accompanying claims.

The invention claimed is:

1. A method for analysing a device for spraying a pharmaceutical fluid product, characterised in that it comprises the following steps:

providing a spray head for a device for spraying a pharmaceutical fluid product, said spray head comprising a spray orifice, providing a receiving surface comprising a perforated plate comprising a plurality of holes, each hole being associated with a ball, in particular made of polystyrene, guided in a guide channel, in particular made of glass, said guide channels extending parallel to one another until reaching a transparent pane behind which a camera is arranged, charging said perforated plate with an electrostatic charge to attract by static electricity said balls to said holes, passing a gas stream through said spray orifice of said spray head, and sending it onto said receiving surface, said balls that are hit by the gas stream being moved to said pane, visualising the impact zone for said compressed gas stream on said receiving surface that is formed by the balls that have been moved to the pane, and analysing said visualisation of said impact zone in order to determine whether or not said impact zone complies with predetermined specifications.

2. The method as claimed in claim 1, wherein said gas stream is a compressed gas stream.

3. The method as claimed in claim 1, wherein said gas stream is a compressed air stream.

4. The method as claimed in claim 1, wherein said step for analysis comprises determining the geometry, in particular the symmetry, of the impact zone for said gas stream on said receiving surface.

5. The method as claimed in claim 1, wherein said predetermined specifications comprise a predetermined planar extent of the impact zone for said gas stream on said receiving surface, in a manner such that the spray heads for which said planar extent is similar to said predetermined planar extent are classified as compliant, and the spray heads for which said planar extent is different from said predetermined planar extent are classified as non-compliant.

6. The method as claimed in claim 1, wherein an operating cycle comprises the following steps:

connecting said perforated plate to ground in order to eliminate any electrical charges, charging said perforated plate with an electrostatic charge to attract said balls to said holes, generating said gas stream and sending it through said spray head onto said receiving surface, each ball that is hit by said gas stream detaching from said perforated plate and being guided onto said pane, visualising said impact zone by taking an image of the balls on said pane by means of said camera.

7. A device for analysing a device for spraying a pharmaceutical fluid product, characterized in that it comprises:

a spray head for a device for spraying a pharmaceutical fluid product, said spray head comprising a spray orifice;

a receiving surface comprising a perforated plate comprising a plurality of holes, each hole being associated with a ball, in particular made of polystyrene, guided in a guide channel, in particular made of glass, said guide channels extending parallel to one another until reaching a transparent pane, an electrical device for charging said perforated plate with an electrostatic charge to attract said balls by static electricity to said holes of said perforated plate, means for generating a gas stream in order to pass a gas stream through said spray orifice of said spray head and sending it onto said receiving surface, said balls that are hit by the gas stream being moved to said pane, a camera for visualising the impact zone for said compressed gas stream on said receiving surface by taking an image of the balls that have been moved by said gas stream to the pane, and analysing means for analysing said image of said impact zone in order to determine whether or not said impact zone complies with predetermined specifications.

8. The device as claimed in claim 7, wherein said gas stream is a compressed air stream.

9. The device as claimed in claim 7, wherein said holes are equidistant from and close to one another, thereby forming a regular and dense array of holes on said receiving surface.

10. The device as claimed in claim 7, wherein said means for generating a compressed gas stream are adapted to generate pulses of adjustable duration, in particular from 50 to 300 ms.

\* \* \* \* \*